US012589478B2

(12) United States Patent (10) Patent No.: US 12,589,478 B2
Kodama et al. (45) Date of Patent: Mar. 31, 2026

(54) ELECTRIC WORKING MACHINE

(71) Applicant: YAMABIKO CORPORATION, Tokyo (JP)

(72) Inventors: Hisao Kodama, Tokyo (JP); Hisato Osawa, Tokyo (JP); Takeshi Maeno, Tokyo (JP); Yusuke Morisaki, Tokyo (JP)

(73) Assignee: YAMABIKO CORPORATION (JP)

( * ) Notice: Subject to any disclaimer, the term of this patent is extended or adjusted under 35 U.S.C. 154(b) by 140 days.

(21) Appl. No.: 18/585,630

(22) Filed: Feb. 23, 2024

(65) Prior Publication Data

US 2024/0300084 A1 Sep. 12, 2024

(30) Foreign Application Priority Data

Mar. 10, 2023 (JP) ................................. 2023-038146

(51) Int. Cl.
*B25F 5/00* (2006.01)
*H02K 5/20* (2006.01)
(Continued)

(52) U.S. Cl.
CPC ............. *B25F 5/008* (2013.01); *H02K 5/207* (2021.01); *H02K 7/145* (2013.01); *H02K 9/06* (2013.01); *H02K 11/33* (2016.01); *A01G 3/086* (2013.01)

(58) Field of Classification Search
CPC ......... B25F 5/008; H02K 11/33; H02K 5/207; H02K 7/145; H02K 9/06
See application file for complete search history.

(56) References Cited

U.S. PATENT DOCUMENTS 6,314,922 B1 * 11/2001 Zimmermann ......... F02B 63/02
123/41.7
10,661,427 B2 * 5/2020 Matsushita ............. B25F 5/008
(Continued)

FOREIGN PATENT DOCUMENTS

CN 101720632 A 6/2010
CN 113170648 A 7/2021
(Continued)

OTHER PUBLICATIONS

European Search Report issued in the corresponding European Patent Application No., 24158656.9; mailed Jul. 24, 2024 (total 8 pages).

(Continued)

*Primary Examiner* — Omar Flores Sanchez
(74) *Attorney, Agent, or Firm* — Harness, Dickey & Pierce, P.L.C.

(57) ABSTRACT

A hand-held electric working machine for cutting a work object is provided. The electric working machine comprises a working portion, a motor, a control unit, and a guide portion. The working portion is configured to cut the work object. The motor is configured to allow rotary power to be generated for allowing the working portion to drive. The control unit is configured to electrically control rotation of the motor. The guide portion is provided on the control unit, thereby forming a first air flow path surrounded by the guide portion and the control unit. The first air flow path is configured to allow air to circulate therein by rotation of the motor, thereby cooling the control unit.

13 Claims, 10 Drawing Sheets

(51) Int. Cl.
  *H02K 7/14*      (2006.01)
  *H02K 9/06*      (2006.01)
  *H02K 11/33*     (2016.01)
  *A01G 3/08*          (2006.01)

(56)                References Cited

U.S. PATENT DOCUMENTS

| | | | | |
|---|---|---|---|---|
| 2008/0106159 A1* | 5/2008 | Yoshida | .................. | A01G 3/088 |
| | | | | 310/64 |
| 2010/0038979 A1* | 2/2010 | Miller | .................... | B23D 53/12 |
| | | | | 310/60 A |
| 2014/0331508 A1* | 11/2014 | Simm | .................... | B25F 5/008 |
| | | | | 30/475 |

| | | | | |
|---|---|---|---|---|
| 2016/0193727 A1* | 7/2016 | Takeda | .................... | B25F 5/008 |
| | | | | 173/46 |
| 2019/0262971 A1* | 8/2019 | Kondo | .............. | H01M 10/6551 |
| 2024/0408684 A1* | 12/2024 | Monteverde | ........... | B25F 5/008 |

FOREIGN PATENT DOCUMENTS

| | | | | |
|---|---|---|---|---|
| DE | 102008057405 A1 | 5/2010 | | |
| JP | 2022-053268 A | 4/2022 | | |
| WO | WO-2014062105 A1 * | 4/2014 | .............. | B25F 5/008 |

OTHER PUBLICATIONS

Office Action issued in the corresponding European Patent Application No. 24 158 656.9; dated Apr. 15, 2025 (total 8 pages).

* cited by examiner

UP
REAR ← → FRONT
DOWN

ELECTRIC WORKING MACHINE

CROSS REFERENCE TO RELATED APPLICATIONS

The present application claims priority under 35 U.S.C. § 119 to Japanese Patent Application No. 2023-038146, filed Mar. 10, 2023, the contents of which are incorporated herein by reference in their entirety.

BACKGROUND

Technical Field

The present invention relates to an electric working machine.

Related Art

As conventional technology, JP 2022-53268 A may be cited.

However, the conventional technology disclosed in JP 2022-53268 A does not sufficiently enable miniaturization of a housing and operability during high-power operation.

In view of the above circumstances, the present invention aims to provide an electric working machine with a more miniaturized housing and improved operability during high-power operation.

SUMMARY

According to an embodiment of the present invention, a hand-held electric working machine for cutting a work object is provided. The electric working machine comprises a working portion, a motor, a control unit, and a guide portion. The working portion is configured to cut the work object. The motor is configured to allow rotary power to be generated for allowing the working portion to drive. The control unit is configured to electrically control rotation of the motor. The guide portion is provided on the control unit, thereby forming a first air flow path surrounded by the guide portion and the control unit. The first air flow path is configured to allow air to circulate therein by rotation of the motor, thereby cooling the control unit.

According to such an embodiment, it is possible to achieve miniaturization of a housing and improvement in operability during high-power operation.

DETAILED DESCRIPTION

Hereinafter, an example of an embodiment of the present invention will be described with reference to drawings.

1. Overall Configuration

In Chapter 1, an electric working machine 1 according to the present embodiment will be described. The electric working machine 1 is a hand-held electric working machine for cutting a work object. Preferably, the electric working machine 1 is a hedge trimmer 11, a brush cutter (not shown), or a chainsaw (not shown). According to such a manner, a miniaturized hedge trimmer 11, a brush cutter, or a chainsaw can be used to cut a work object. The hedge trimmer 11 (electric working machine 1) will be described below as an example.

Figure 1:
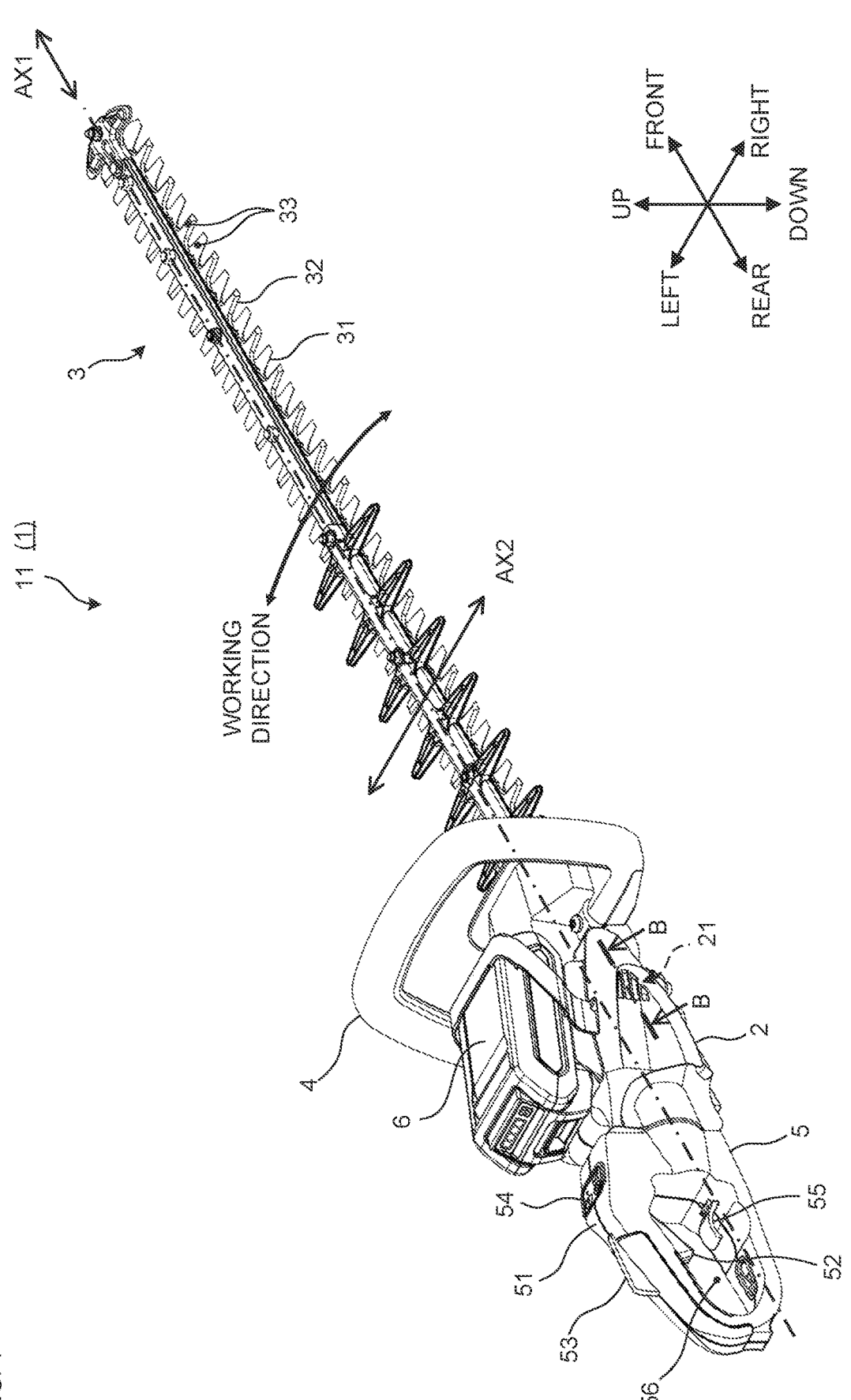
FIG. 1 is an overall perspective view of a hedge trimmer 11 as viewed from above.
Figure 2:
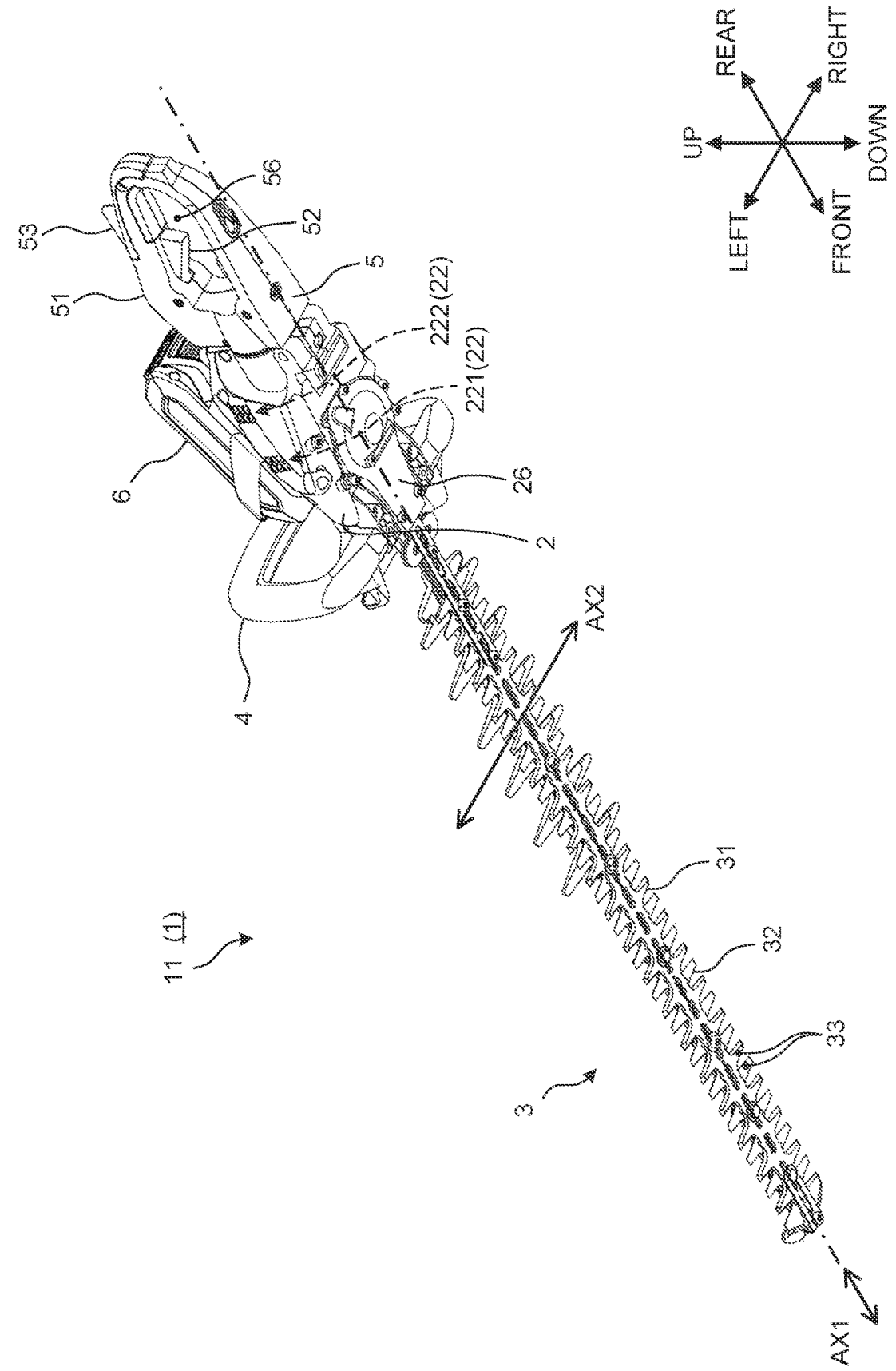
FIG. 2 is an overall perspective view of a hedge trimmer 11 as viewed from below.
Figure 3:
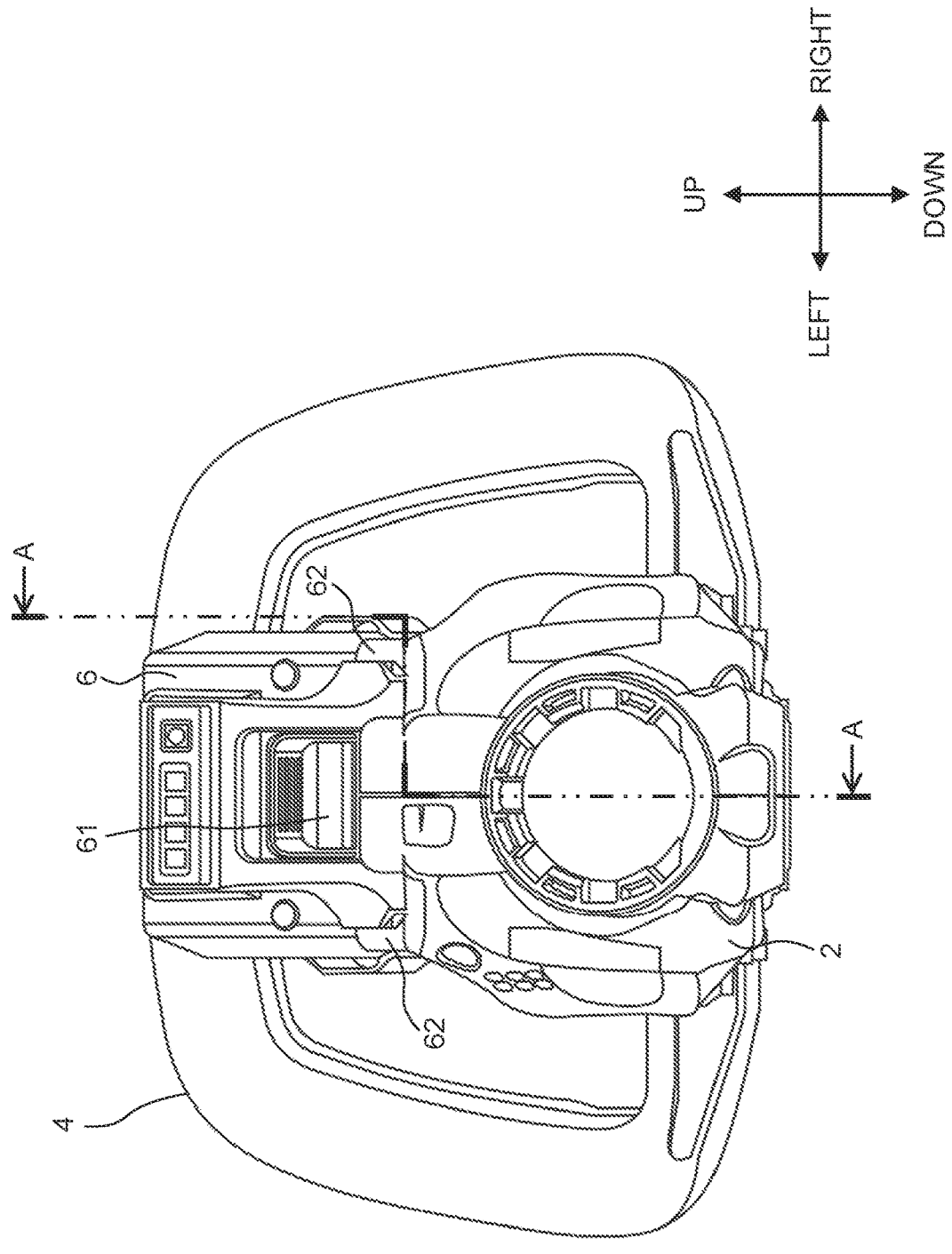
FIG. 3 is a view from a rear side of a hedge trimmer 11 in a state where a rear handle 5 is removed.
Figure 4:
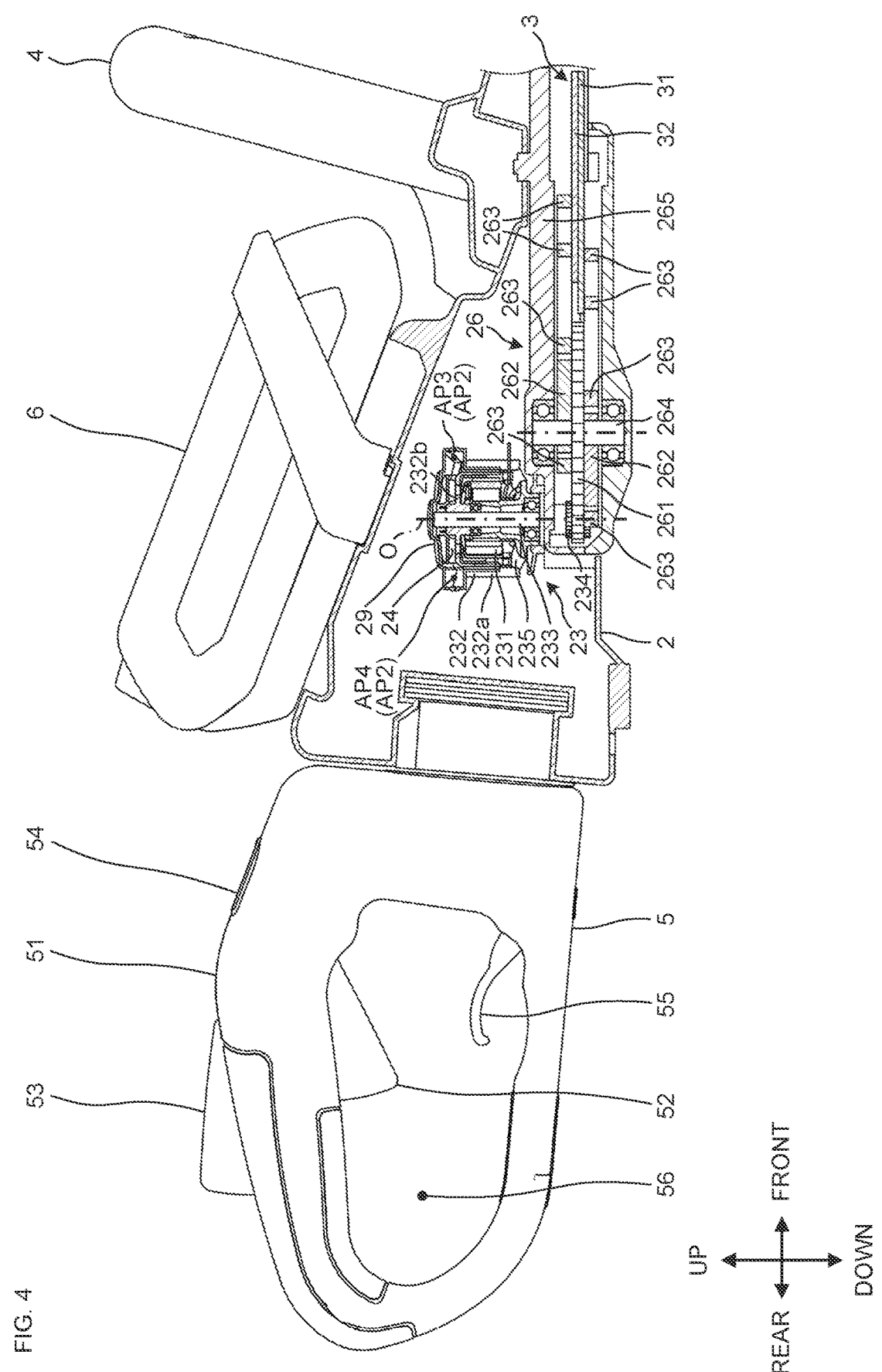
FIG. 4 is a view from a left side of a housing 2 in a state represented by an A-A section shown in FIG. 3 and a motor 23 in a state represented by a section along a rotation center O of the motor 23.

FIG. 1 is an overall perspective view of the hedge trimmer 11 as viewed from above. FIG. 2 is an overall perspective view of the hedge trimmer 11 as viewed from below. As shown in FIGS. 1 and 2, the hedge trimmer 11, which is the electric working machine 1, comprises a housing 2, a working portion 3, a front handle 4, a rear handle 5, and a battery 6. FIG. 3 is a view from a rear side of the hedge trimmer 11 in a state where the rear handle 5 is removed. FIG. 4 is a view from a left side of the housing 2 in a state represented by an A-A section shown in FIG. 3 and a motor 23 in a state represented by a section along a rotation center O of the motor 23. It should be noted that directions of each component configuring the hedge trimmer 11 are defined based on "up," "down," "left," "right," "front," and "rear" shown in the drawings.

(Housing 2)

In the present embodiment, the housing 2 is a box containing a mechanical and electrical equipment that allows the hedge trimmer 11 to operate. The housing 2 extends in a first direction AX1 from a rear side where a user is positioned to a front side where a work object is positioned, with the housing 2 as reference. The housing 2 is a plastic box with an upper surface inclined with respect to a lower surface. The upper surface of the housing 2 inclines downward from a rear side toward a front side. In other words, the housing 2 is formed with front lower than rear. The housing 2 is approximately triangular in shape in a side view. An internal component of the housing 2 will be described in detail later.

(Inlet 21 and Outlet 22)

As shown in FIGS. 1 and 2, the housing 2 includes an inlet 21 and an outlet 22 for circulating air inside the housing 2. The inlet 21 is provided on a side part of a right side of the housing 2 to allow air to be drawn from outside to inside of the housing 2. The outlet 22 is provided on a side part of a left side of the housing 2 to allow air to be exhausted from inside of the housing 2 to outside. Preferably, as shown in the drawing, the outlet 22 has a first outlet 221 and a second outlet 222 positioned differently from the first outlet 221. In other words, the inlet 21 is provided on a side of the housing 2 positioned in a second direction AX2 with respect to a centerline of the housing 2. The centerline extends in the first direction AX1, and the second direction AX2 is perpendicular to the first direction AX1. The outlet 22 is provided on a side of the housing 2, opposite to the inlet 21 across the centerline. With such a manner, the inlet 21 and the outlet 22 are provided on opposite side parts of the housing 2, preventing air used for cooling from being drawn again. This ensures efficient cooling of a control unit 27 and the motor 23. Details regarding cooling will be described later.

(Drive Transmission Mechanism 26)

As shown in FIG. 2, the housing 2 comprises a drive transmission mechanism 26 on a lower side of the housing 2. As shown in FIG. 4, the drive transmission mechanism 26 includes a drive gear 261, two upper and lower cams 262 provided on the drive gear 261, and two upper and lower movable plates 263. The drive gear 261 is a disk-shaped gear with a support axis 264 protruding from a center in a vertical direction. Upper and lower ends of the support axis 264 are rotatably supported by upper and lower bearings provided in a case 265. In other words, the drive gear 261 rotates around an axis of the support axis 264.

Two upper and lower cams 262 protrude from an upper surface and a lower surface of the drive gear 261, respectively. The cams 262 are provided at positions eccentric with respect to a rotation center of the drive gear 261.

The upper cam 262 is inserted into an opening at a rear end of the upper movable plate 263, and a front end of the upper movable plate 263 is connected to a rear end of an upper cutter 32. The lower cam 262 is inserted into an opening at a rear end of the lower movable plate 263, and a front end of the lower movable plate 263 is connected to a rear end of a lower cutter 31.

In the drive transmission mechanism 26, the two upper and lower cams 262 rotate and move respectively as the drive gear 261 rotates, enabling the two upper and lower movable plates 263 to reciprocate in a front-rear direction, respectively, in such a manner that the upper cutter 32 and the lower cutter 31 move reciprocally in opposite front-rear direction.

(Working Portion 3)

As shown in FIGS. 1 and 2, the working portion 3 is provided on a front side of the housing 2. The working portion 3 comprises a blade 33 for cutting a work object and is configured to drive by rotation of the motor 23. In other words, the working portion 3 is configured to cut the work object. Specifically, the working portion 3 comprises the lower cutter 31 and the upper cutter 32. That is, the working portion is configured to cut the work object. The lower cutter 31 and the upper cutter 32 are superimposed on each other and are provided so as to be relatively slidable along a longitudinal direction (front-rear direction). It should be noted that a configuration of the lower cutter 31 and a configuration of the upper cutter 32 are substantially the same blade configuration. The hedge trimmer 11 shown in FIGS. 1 and 2 is a dual-blades specification with blades 33 provided on both sides of a left-right direction, but the configuration may be a single-blade specification with the blade 33 provided on one side in a left-right direction as well.

(Front Handle 4 and Rear Handle 5)

As shown in FIGS. 1 and 2, the hedge trimmer 11 comprises a front handle 4 provided on a front side of the housing 2 and a rear handle 5 provided on a rear side of the housing 2. By grasping the front handle 4 and the rear handle 5 by a hand, the hedge trimmer 11 can be operated.

The front handle 4 has a horizontal portion extending in a left-right direction and a vertical portion extending downward from left and right ends of the horizontal portion, and these are integrally formed. Lower ends of two vertical portions are fixed to a front end of the housing 2.

The rear handle 5 is connected to rear of the housing 2, rotatable about an axis along a front-rear direction as a central axis. A gripping portion 51 with an opening 56 formed therethrough in a left-right direction is formed on the rear handle 5. When an operator, who is a user, holds the hedge trimmer 11, he/she grips the rear handle 5 by inserting a hand into the opening 56 of the gripping portion 51.

As shown in FIGS. 1 and 2, a throttle lever 52, which serves as an operation means to allow the working portion 3 to drive while being gripped by the operator, is provided on an inner circumference of the gripping portion 51 of the rear handle 5. Further, on an upper side of the gripping portion 51, a lock release lever 53 to prevent and release a displacement (operation) of the throttle lever 52 is provided along with a power switch 54. Furthermore, on a lower side of the gripping portion 51, a rotation lock lever 55 is provided to prevent and release rotation of the rear handle 5 with respect to the housing 2 when the working portion 3 is not in operation.

(Battery 6)

The battery 6 is a common battery that realizes a predetermined output by accommodating two or more lithium-ion battery cells in a rectangular case extending in a front-rear direction. The battery 6 is configured to be mountable on a battery mounting portion 62 provided on an upper surface of the housing 2. The battery mounting portion 62 is inclined downward from rear to front in alignment with the upper surface of the housing 2.

Although not shown in the drawing, an engagement portion engaging with the battery mounting portion 62 protrudes from a rear end of a lower surface of the battery 6. When mounting the battery 6 to the battery mounting portion 62, a lower portion of the battery 6 is allowed to fit into the battery mounting portion 62 while sliding the battery 6 with respect to the battery mounting portion 62 from rear to front. When the battery 6 is allowed to move to a position where a front end of the battery 6 is supported by a front end of the battery mounting portion 62, the engagement portion of the battery 6 engages with the battery mounting portion 62 and the battery 6 is fixed to the battery mounting portion 62.

The battery 6 mounted on the battery mounting portion 62 is inclined downward from rear to front, with front positioned lower than rear. On an upper surface of the battery mounting portion 62, a metallic connection terminal (not shown) is provided. The connection terminal is electrically connected to the motor 23 or the control unit 27. By electrically connecting a connection terminal of the battery 6 to the connection terminal of the battery mounting portion 62, power is supplied from the battery 6 to the motor 23 or the control unit 27.

When removing the battery 6 from the battery mounting portion 62, lifting a connection lever 61 (refer to FIG. 3) provided at a rear end of the battery 6 to release an engagement state between the battery mounting portion 62 and the engagement portion, allowing the battery 6 to slide backward with respect to the battery mounting portion 62.

2. Internal Component of Housing 2

Figure 5:
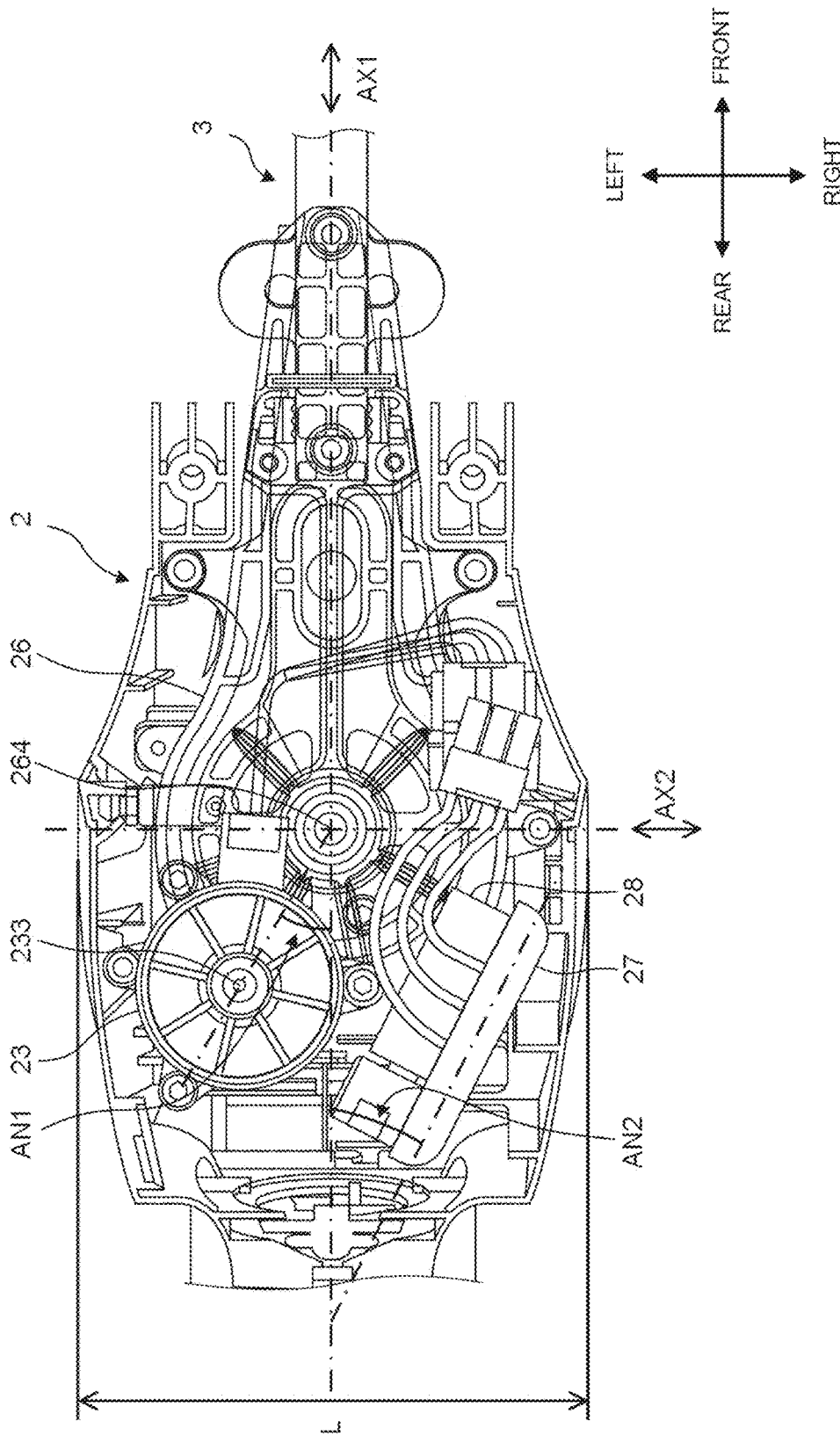
FIG. 5 is a view from above of a housing 2 in a state where a part of the housing 2 is removed or sectioned.
Figure 6:
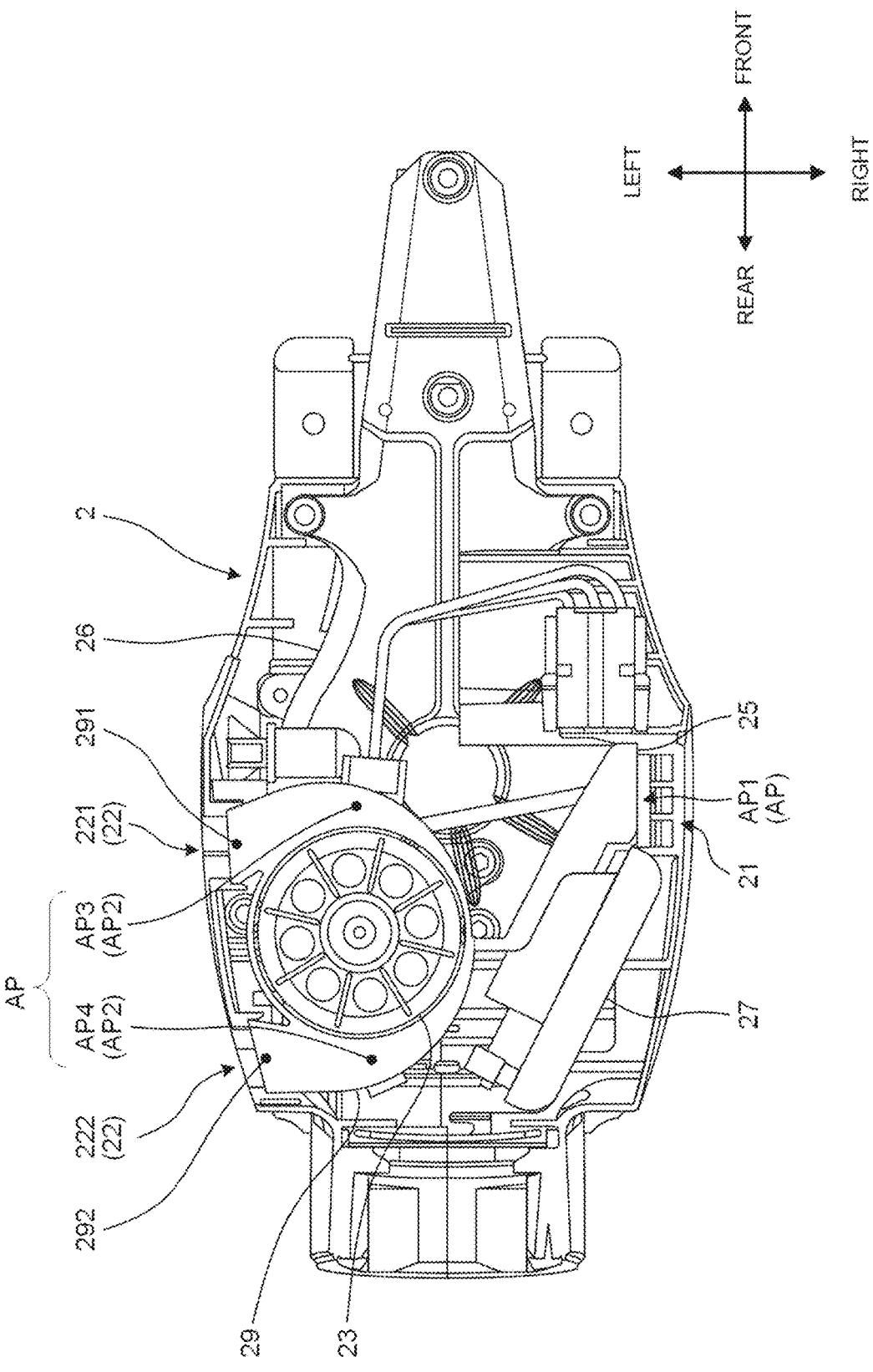
FIG. 6 is a view from above of a housing 2 in a state where a part of the housing 2 is removed.
Figure 7:
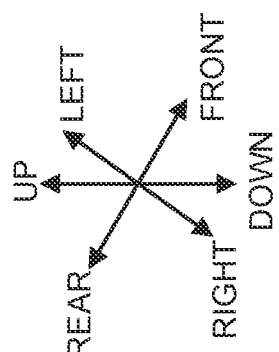
FIG. 7 is a view from above of a housing 2 in a state represented by a B-B section shown in FIG. 1, illustrating a first air flow path AP1.
Figure 7:
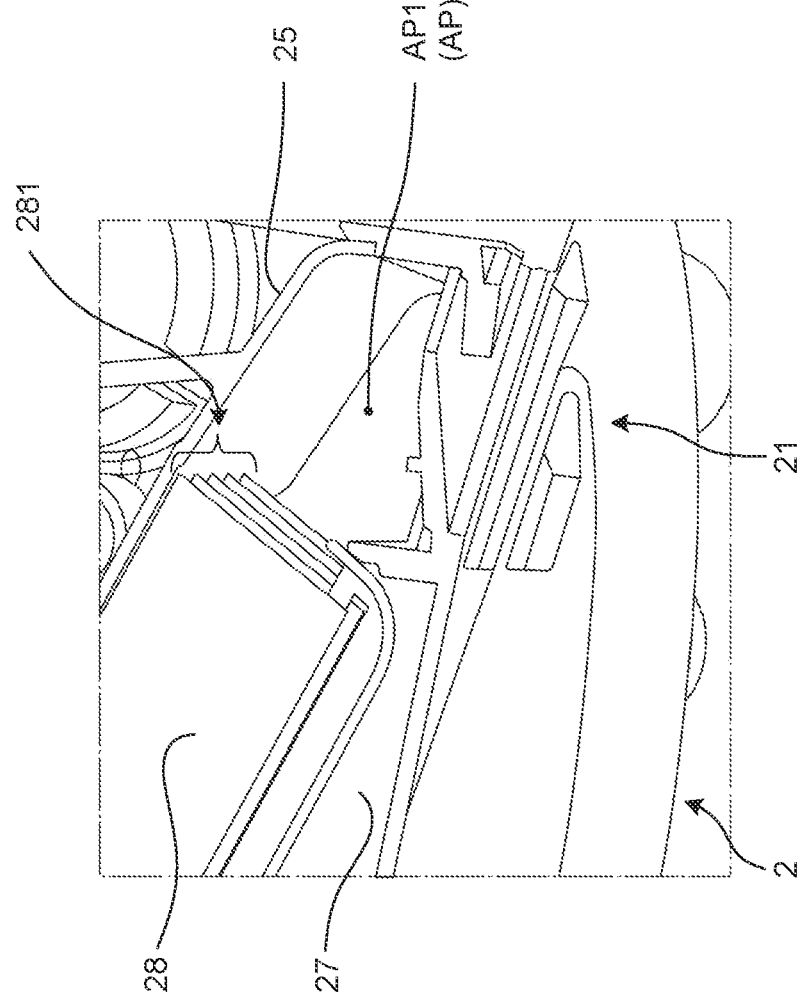
Figure 8:
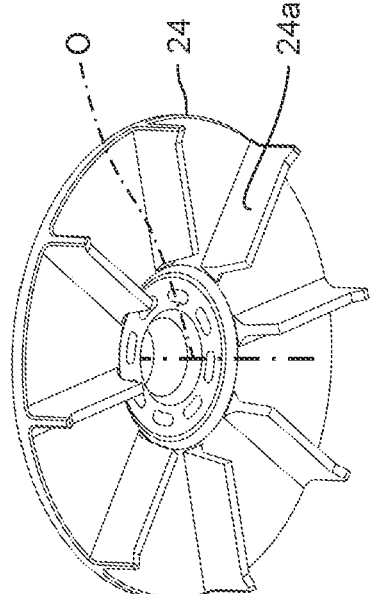
FIG. 8 is an overall perspective view of a fan 24 as viewed from below.
Figure 9:
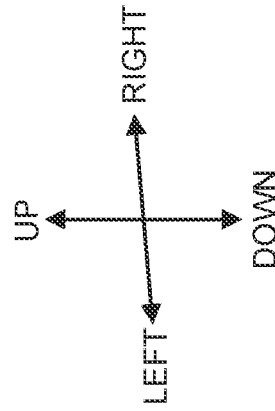
FIG. 9 is a view illustrating an inlet 21 in a state where a part of a housing 2 is sectioned.
Figure 9:
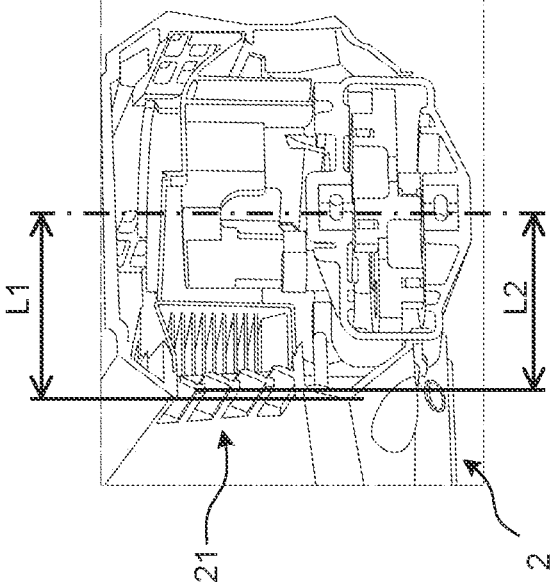
Figure 10:
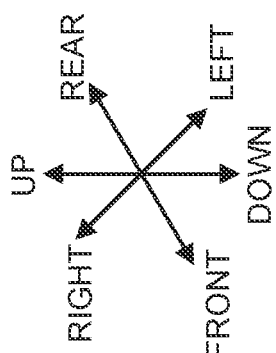
FIG. 10 is a view illustrating an outlet 22 in a state where a part of a housing 2 is sectioned and a second air flow path AP2.
Figure 10:
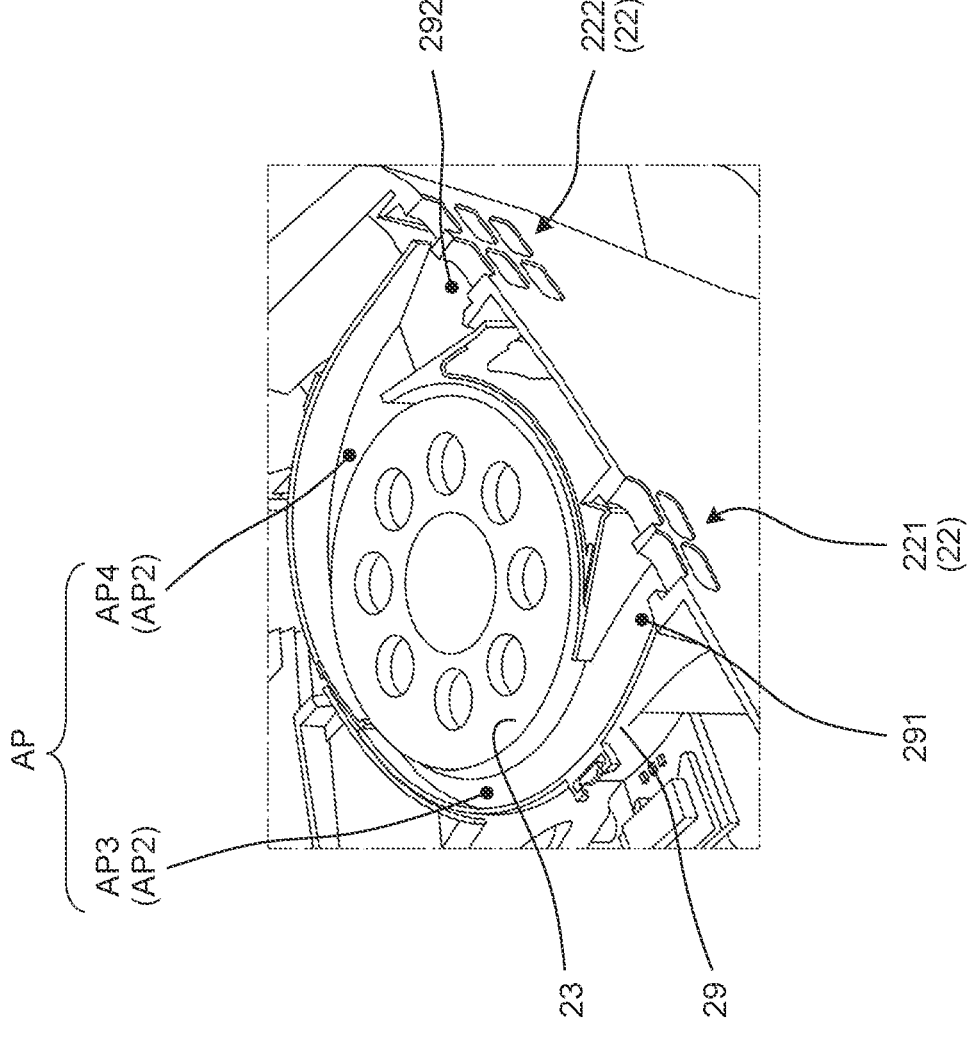

This chapter describes an internal component of the housing 2. FIG. 5 is a view from above of the housing 2 in a state where a part of the housing 2 is removed or sectioned. FIG. 6 is a view from above of the housing 2 in a state where a part of the housing 2 is removed. FIG. 7 is a view from above of the housing 2 in a state represented by a B-B section shown in FIG. 1, illustrating a first air flow path AP1. FIG. 8 is an overall perspective view of a fan 24 as viewed from below. FIG. 9 is a view illustrating the inlet 21 in a state where a part of the housing 2 is sectioned. FIG. 10 is a view illustrating the outlet 22 and a second air flow path AP2 in a state where a part of the housing 2 is sectioned. As shown in FIGS. 4 to 10, the housing 2 includes the motor 23, a fan 24, a guide portion 25, the control unit 27, and a heat sink 28 therein.

(Motor 23)

As shown in FIG. 4, the motor 23 includes a stator 231, an outer rotor 232, an output axis 233, an output gear 234, and a base member 235. The stator 231 has two or more coils. A lower end of the base member 235 is fixed to the case 265 of the drive transmission mechanism 26.

The output axis 233 is inserted into a bearing provided on an inner circumferential surface of the base member 235. This allows the output axis 233 to be rotatably supported by the base member 235. The output axis 233 is inserted into a bearing provided on an inner circumferential surface of the stator 231. This allows the output axis 233 to be rotatably supported by the stator 231. The output gear 234 is provided at a lower end of the output axis 233. The output gear 234 is meshed with the drive gear 261 of the drive transmission mechanism 26.

The outer rotor 232 includes a cylindrical peripheral wall 232a surrounding the stator 231 and outer circumference of each coil, and a top 232b that covers an upper surface of the peripheral wall 232a. Two or more magnets are attached to an inner circumferential surface of the peripheral wall 232a.

An upper end of the output axis 233 is connected to a center of a top 232b of the outer rotor 232. Thus, the outer rotor 232 is rotatably supported by the stator 231, and the output axis 233 and the outer rotor 232 rotate in conjunction. The rotation center O of the outer rotor 232 and the output axis 233 extends in a vertical direction of the housing 2.

The outer rotor 232 is rotatably supported by the stator 231 and is connected to a rear end of the working portion 3 through the drive transmission mechanism 26. When power is supplied from the battery 6 to each coil of the stator 231, the outer rotor 232 and the output axis 233 rotate, and driving force thereof is transmitted to the working portion 3 via the drive transmission mechanism 26, causing the lower cutter 31 and the upper cutter 32 to reciprocate in opposite front-back direction. In other words, the motor 23 is configured to allow rotary power to be generated allowing the working portion 3 to drive.

(Fan 24)

The fan 24 is connected to an upper end of the output axis 233 of the motor 23 and is positioned inside an air flow path AP, as shown in FIG. 4. That is, the motor 23 comprises the fan 24 that rotates in conjunction with rotation of the motor 23. Thereby, the fan 24 is configured to circulate air inside the air flow path AP by the rotation of the motor 23. Specifically, the fan 24 is configured to exhaust air inside the air flow path AP from the outlet 22 toward outside of the housing 2, and to draw in air outside the housing 2 from the inlet 21 toward inside of the housing 2. Further, the motor 23 is configured to rotate in two rotation directions: right rotation and left rotation. The fan 24 has two or more linear-shaped vanes 24a so as to extend straight outward in a circumferential direction from the rotation center O, which is a center of an axis on which the motor rotates, as shown in FIG. 8. Such a manner enables air to circulate regardless of whether the rotation direction is left or right.

(Control Unit 27)

As shown in FIGS. 5 and 6, the control unit 27 has a box shape and is fixed to the housing 2. The control unit 27 is electrically connected to the battery 6 and the motor 23 by wiring, connector, etc., and controls energization from the battery 6 to the motor 23. In other words, the control unit 27 is configured to electrically control rotation of the motor 23.

(Guide Portion 25)

As shown in FIGS. 6 and 7, the guide portion 25 is provided to form the air flow path AP with a plate-like member. The guide portion 25 is provided on the control unit 27, thereby forming the first air flow path AP1 surrounded by the guide portion 25 and the control unit 27. The first air flow path AP1 is configured to allow air to circulate therein by rotation of the motor 23, thereby cooling the control unit 27. According to such a manner, the control unit 27 may be sufficiently cooled by providing the air flow path AP surrounded by the guide portion 25 and the control unit 27, thereby improving compactness and operability during high-power operation.

(Fan Case 29)

As shown in FIGS. 4 and 6, a fan case 29 is provided to cover outside of the motor 23 and to form the second air flow path AP2. As shown in FIGS. 6 and 10, the second air flow path AP2 has a first discharge 291 and a second discharge 292. The first discharge 291 is provided at a position connected to the first outlet 221, and the second discharge 292 is provided at a position connected to the second outlet 222. Preferably, the second air flow path AP2 may be formed in such a manner that air is circulated inside the motor 23. More preferably, the second air flow path AP2 may be formed in such a manner that air is taken in from a lower part of the motor 23 and air flows toward an upper part of the motor 23. Preferably, the first air flow path AP1 is connected to the second air flow path AP2 provided in a vicinity of the motor 23. The second air flow path AP2 is configured to allow air to circulate therein by rotation of the motor 23, thereby cooling the motor 23 following the control unit 27. In other words, with rotation of the fan 24 accompanying the rotation of the motor 23, air taken from outside to inside of the housing 2 passes through the first air flow path AP1, cooling the control unit 27, and air that has cooled the control unit 27 is taken in from the lower part of the motor 23, passes through an air flow path inside the motor 23, and exhausts air that has cooled electronics (the control unit 27 and the motor 23, etc.) to outside of the housing 2. According to such a manner, by arranging and cooling the motor 23 following the control unit 27, it is possible to suppress temperature rise and enable continuous operation at a high load.

(Heat Sink 28)

As shown in FIGS. 6 and 7, the heat sink 28 is provided in contact with the control unit 27 so as to dissipate heat generated by the control unit 27. The heat sink 28 is provided inside the first air flow path AP1 formed by being surrounded by the guide portion 25 and the control unit 27. In other words, the first air flow path AP1 includes the heat sink 28 therein, the heat sink 28 configured to exchange heat with circulating air. According to such a manner, the control unit 27 may be further cooled by providing the heat sink 28, thus enabling compactness and operation during high-power operation.

Preferably, as shown in FIG. 7, the heat sink 28 has a fin 281 extending vertically from a surface in contact with the control unit 27. The fin 281 extends further in a direction along a flow of air circulating in the first air flow path AP1. With such a manner, cooling performance may be improved, enabling compactness and operation during high-power operation.

As shown in FIG. 6, the housing 2 comprises an air flow path AP therein. The air flow path AP includes the first air flow path AP1 and the second air flow path AP2, and further, the second air flow path AP2 includes a third air flow path AP3 and a fourth air flow path AP4. The first air flow path AP1 is configured in such a manner that one end thereof is connected to the second air flow path AP2 and another end with respect to the one end is connected to the inlet 21. According to such a manner, the control unit 27 may be efficiently cooled. The second air flow path AP2 is configured in such a manner that one end thereof is connected to the first air flow path AP1 and another end with respect to the one end is connected to the outlet 22. According to such a manner, by arranging and cooling the motor 23 following the control unit 27 between the inlet 21 and the outlet 22, it is possible to suppress temperature rise and enable continuous operation at a high load.

As shown in FIG. 4, the fan 24 is provided inside the fan case 29 that forms the air flow path AP. The fan 24 is connected to an upper end of the output axis 233 of the motor 23, rotating with rotation of the motor 23. Thereby, the fan 24 allows air to flow from outside of the housing 2 to inside of the housing 2 and allows air to circulate in the air flow path AP. In other words, the fan 24 is provided inside the second air flow path AP2 by being connected to the upper end of the output axis 233 of the motor 23, allowing air to circulate inside the air flow path AP. As shown in FIG. 10, the second air flow path AP2 has the third air flow path AP3 and the fourth air flow path AP4 to branch air circulation in a vicinity of the fan 24. The third air flow path AP3 and the fourth air flow path AP4 are configured in such a manner that amount of air circulation varies respectively according to a rotation direction of the motor 23. With such a manner, since the fan 24 is provided with an air flow path corresponding to the rotation direction and has linear-shaped blades 24a, it is possible to circulate air regardless of whether the rotation direction is left or right. Preferably, as shown in FIG. 10, the third air flow path AP3 is provided with a portion along approximately half circumference of an outer periphery of the fan 24. The fourth air flow path AP4 is provided so as to have a portion along approximately half circumference of the outer periphery of the fan 24 so as to oppose the third air flow path AP3 across an axis. According to such a manner, it is possible to allow air to circulate efficiently. Even more preferably, as shown in FIG. 10, the third air flow path AP3 and the fourth air flow path AP4 are configured in such a manner that a cross-sectional area of the air flow path AP expands from upstream to downstream in an air flow direction. According to such a manner, it is possible to efficiently circulate air.

As shown in FIG. 10, the outlet 22 is configured in such a manner that the first outlet 221 is connected to the third air flow path AP3 and the second outlet 222 is connected to the fourth air flow path AP4. According to such a manner, air exhausted from the first outlet 221 or the second outlet 222 does not return to inside of the housing 2.

The inlet 21 or the outlet 22 shall preferably be provided on a surface that is recessed from an outer shape of the housing 2. Specifically, as shown in FIG. 9, the housing 2 has a first width L1 and a second width L2 that is narrower than the first width L1 toward a direction where the inlet 21 is provided from the centerline of the housing 2. The inlet 21 is provided on a side of the housing 2 where the second width L2 is positioned. According to such a manner, even when a user, who is an operator, is in contact with the housing 2, it is possible to prevent a body, clothes, etc. of the user from coming into close contact with the housing 2 and blocking the inlet 21 or the outlet 22.

Preferably, as shown in FIG. 9, the inlet 21 shall have a louver so as to prevent an object from entering from an upper direction of the housing 2. With such a manner, rainwater or the like descending from an upper side to a lower side of the housing 2 can be prevented from entering inside of the housing 2.

3. Arrangement of Motor 23 and Control Unit 27

In this chapter, an arrangement position of internal components of the housing 2, namely the motor 23 and the control unit 27, will be described. As shown in FIG. 5, the motor 23 is provided on a rear side of the housing 2, displaced in the second direction AX2 with respect to the centerline of the housing 2. The control unit 27 is then provided at a position opposite to the motor 23 across the centerline of the housing 2. The centerline of the housing 2 extends in the first direction AX1, and the second direction AX2 is perpendicular to the first direction AX1. With such a manner, compactness of the housing 2 may be realized. Furthermore, as shown in FIG. 5, the housing 2 has a predetermined width L in the second direction AX2. The motor 23 and the control unit 27 are each provided inside the housing 2 so as not to exceed the predetermined width L. With such a manner, components are arranged so as not to exceed the predetermined width L, enabling miniaturization. In other words, by arranging the motor 23 and the control unit 27 so as not to exceed the width (the predetermined width L) in the second direction AX2 in the drive transmission mechanism 26, the housing 2, etc., it is possible to reduce the width of the housing 2 in the first direction AX1 without increasing the width of the housing 2 in the second direction AX2, enabling miniaturization of the housing 2.

The motor 23 is preferably positioned in an optimal location to enable the miniaturization of the housing 2. As shown in FIG. 5, a first angle AN1 is preferably adopted for the arrangement of the motor 23. Specifically, the first angle AN1 is an acute angle formed by a line connecting a center of the output axis 233, which is a rotation axis of the motor 23, to a center of the support axis 264 (a predetermined position), which is on a centerline of the housing 2, and the centerline of the housing 2. The motor 23 is provided in such a manner that the first angle AN1 is any angle from 15 degrees to 45 degrees. The first angle AN1 may specifically be, for instance, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45 degrees, or may be fall within a range of any two of numerical values exemplified here. With such a manner, the motor 23 may be optimally positioned, enabling miniaturization of the housing 2.

The control unit 27 is preferably positioned in an optimal location to enable the miniaturization of the housing 2. As shown in FIG. 5, a second angle AN2 is preferably adopted for the arrangement of the control unit 27. Specifically, the second angle AN2 is an acute angle formed by a line along a longitudinal direction of the control unit 27 and the centerline of the housing 2. The control unit 27 is provided in such a manner that the second angle AN2 is any angle from 15 degrees to 45 degrees. The second angle AN2 may specifically be, for instance, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45 degrees, or may be fall within a range of any two of numerical values exemplified here. With such a manner, the control unit 27 may be optimally positioned, enabling miniaturization of the housing 2. Additionally, it is further preferable for the control unit 27 to be provided in such a manner that the second angle AN2 is smaller than the first angle AN1. Such a manner allows for the optimal positioning of the motor 23 and the control unit 27, enabling miniaturization of the housing 2.

[Others]

The present embodiment may be implemented in various manners as follows.

In the example shown in FIGS. 1 and 2, although the inlet 21 is provided on the side part of the right side of the housing 2 and the outlet 22 is provided on the side part of the left side of the housing 2, the configuration is not limited thereto. Specifically, for instance, the inlet 21 and the outlet 22 may be provided on the housing 2 according to a position where a user, who is an operator, grips and operates the electric working machine 1. For example, for a hedge trimmer 11 with dual blades, the inlet 21 and the outlet 22 may be positioned as follows: the inlet 21 is provided on a side where the user, who is the operator, stands for a long time against the hedge trimmer 11, and the outlet 22 is provided on a side opposite to where the user, who is the operator, stands for a long time against the hedge trimmer 11. Further, for a hedge trimmer 11 with a single blade, the inlet 21 and the outlet 22 may be positioned as follows: the inlet 21 is provided on a side where the user, who is the operator, stands against the hedge trimmer 11, and the outlet 22 is provided on a side opposite to where the user, who is the operator, stands against the hedge trimmer 11.

Additionally, the housing 2 may be configured to draw air from outside toward inside of the housing 2 from a portion other than the inlet 21. For instance, the housing 2 may have a gap, a hole, etc. With such a manner, when a user, who is an operator, stands on a side of the inlet 21 and blocks the inlet 21 with his/her body, clothing, etc., air may be drawn in through the gap, the hole, etc. toward inside of the housing 2.

Furthermore, each manner described below may be provided.

(1) A hand-held electric working machine for cutting a work object, comprising: a working portion configured to cut the work object; a motor configured to allow rotary power to be generated for allowing the working portion to drive; a control unit configured to electrically control rotation of the motor; and a guide portion provided on the control unit, thereby forming a first air flow path surrounded by the guide portion and the control unit, wherein the first air flow path is configured to allow air to circulate therein by rotation of the motor, thereby cooling the control unit.

According to such a manner, by providing an air flow path surrounded by a guide portion and a control unit, it is possible to sufficiently cool the control unit, thereby enabling miniaturization and improvement of operability during high-power operation.

(2) The electric working machine according to (1), wherein: the first air flow path connects to a second air flow path provided in a vicinity of the motor, and the second air flow path is configured to allow air to circulate therein by rotation of the motor, thereby cooling the motor following the control unit.

With such a manner, by arranging and cooling a motor following a control unit, it is possible to suppress temperature rise and enable continuous operation at high load.

(3) The electric working machine according to (1) or (2), wherein: the first air flow path includes a heat sink configured to exchange heat with circulating air therein, and the heat sink is provided in contact with the control unit so as to dissipate heat generated by the control unit.

According to such a manner, by providing a heat sink, it is possible to further cool a control unit, enabling miniaturization and operability during high-power operation.

(4) The electric working machine according to (3), wherein: the heat sink has a fin extending toward a vertical direction from a surface in contact with the control unit, and the fin further extends in a direction along air flow circulating in the first air flow path.

Such a manner contributes to improvement of cooling performance, enabling miniaturization and operability during high-power operation.

(5) The electric working machine according to any one of (1) to (4), further comprising: a housing extending in a first direction from a rear side where a user is positioned to a front side where the work object is positioned, and having an inlet and an outlet for allowing air to circulate inside the housing, wherein the inlet is provided on a side of the housing positioned in a second direction with respect to a centerline of the housing, the centerline extending in the first direction and the second direction being perpendicular to the first direction, and the outlet is provided on a side of the housing facing the inlet across the centerline.

According to such a manner, by providing an inlet and an outlet on opposing sides of a housing, air used for cooling is not drawn in again, allowing for efficient cooling.

(6) The electric working machine according to (5), wherein: the first air flow path is configured in such a manner that one end thereof is connected to the second air flow path and another end with respect to the one end is connected to the inlet.

According to such a manner, a control unit may be efficiently cooled.

(7) The electric working machine according to (5) or (6), wherein: the second air flow path is configured in such a manner that one end thereof is connected to the first air flow path and another end with respect to the one end is connected to the outlet.

According to such a manner, by arranging and cooling a motor following a control unit between an inlet and an outlet, it is possible to suppress temperature rise and enable continuous operation at a high load.

(8) The electric working machine according to any one of (5) to (7), wherein: the motor includes a fan rotating with rotation of the motor, and is configured to be rotatable in two rotational directions as right rotation and left rotation, the fan has two or more linear-shaped vanes so as to extend straight from a center of an axis around which the motor rotates toward outside in a circumferential direction, and is provided inside the second air flow path, allowing air to circulate inside the air flow path, the second air flow path has a third air flow path and a fourth air flow path so as to branch air circulation in a vicinity of the fan, and the third air flow path and the fourth air flow path are configured in such a manner that amount of air circulation varies according to a rotational direction of the motor, respectively.

According to such a manner, by providing an air flow path corresponding to a rotation direction and using a fan having vane with linear shape, it is possible to circulate air regardless of whether the rotation direction is left or right.

(9) The electric working machine according to (8), wherein: the third air flow path is provided with a portion along approximately half circumference of an outer periphery of the fan, and the fourth air flow path is provided with a portion along approximately half circumference of an outer periphery of the fan, facing the third air flow path across the axis.

According to such a manner, it is possible to circulate air efficiently.

(10) The electric working machine according to (9), wherein: the third air flow path and the fourth air flow path are configured in such a manner that a cross-sectional area of the air flow path expands from upstream to downstream in an air flow direction.

According to such a manner, it is possible to circulate air efficiently.

(11) The electric working machine according to any one of (8) to (10), wherein: the outlet has a first outlet and a second outlet positioned differently from the first outlet, and the first outlet is connected to the third air flow path and the second outlet is connected to the fourth air flow path.

According to such a manner, air exhausted from a first outlet or a second outlet does not return to inside of a housing.

(12) The electric working machine according to any one of (5) to (11), wherein: the housing has a first width and a second width that is narrower than the first width toward from a centerline of the housing to a direction where the inlet is provided, and the inlet is provided on a side of the housing where the second width is positioned.

According to such a manner, even when a user, who is an operator, is in contact with a housing, it is possible to prevent a body, clothes, etc. of the user from coming into close contact with the housing and blocking the inlet or the outlet.

(13) The electric working machine according to any one of (5) to (12), wherein: the inlet has a louver to prevent an object from entering the housing from an upper direction.

With such a manner, rainwater or the like descending from an upper side to a lower side of a housing can be prevented from entering inside of the housing.

(14) The electric working machine according to any one of (1) to (13), wherein: the electric working machine is a hedge trimmer, a brush cutter, or a chainsaw.

According to such a manner, a miniaturized hedge trimmer, a brush cutter, or a chainsaw may be adopted to cut a work object.

Of course, the present invention is not limited thereto.

Finally, although various embodiments of the present invention have been described, these are presented as examples and are not intended to limit the scope of the present invention. Other novel embodiments may be implemented in various forms, and various omissions, substitutions, and modification may be made within the scope of invention without departing from the spirit of the present invention. The embodiments or modifications thereof are included in the scope and spirit of the present invention, as well as within the scope of the invention and equivalents thereof recited in the claims.

What is claimed is:

1. A hand-held electric working machine for cutting a work object, comprising:
    a working portion configured to cut the work object;
    a motor configured generate rotary power to drive the working portion;
    a control unit configured to electrically control rotation of the motor;

a guide portion provided on the control unit, thereby forming a first air flow path surrounded by the guide portion and the control unit, wherein the first air flow path is configured to circulate air therein by rotation of the motor, thereby cooling the control unit; and a housing:
    extending in a first direction from a rear side where a user is positioned to a front side where the work object is positioned; and
    having an inlet and an outlet that are configured to circulate air inside the housing, wherein
    the inlet is provided on a first side of the housing positioned in a second direction with respect to a centerline of the housing, the centerline extends along the first direction, and the second direction is perpendicular to the first direction, and
    the outlet is provided on a second side of the housing facing the inlet across the centerline.

2. The electric working machine according to claim 1, wherein
    the first air flow path connects to a second air flow path provided in a vicinity of the motor, and
    the second air flow path is configured to circulate air therein by rotation of the motor, thereby cooling the motor following the control unit.

3. The electric working machine according to claim 1, wherein
    the first air flow path includes a heat sink configured to exchange heat with the air circulating therein, and
    the heat sink is provided in contact with the control unit so as to dissipate the heat generated by the control unit.

4. The electric working machine according to claim 3, wherein
    the heat sink has a fin extending toward a vertical direction from a surface that is in contact with the control unit, and
    the fin further extends in a direction along air flow circulating in the first air flow path.

5. The electric working machine according to claim 1, further comprising:
    a second air flow path provided in a vicinity of the motor, wherein
    the first air flow path is configured in such a manner that one end of the first air flow path is connected to the second air flow path and the other end of the first air flow path is connected to the inlet.

6. The electric working machine according to claim 1, further comprising:
    a second air flow path provided in a vicinity of the motor, wherein
    the second air flow path is configured in such a manner that one end of the second air flow path is connected to the first air flow path and the other end of the second air flow path is connected to the outlet.

7. The electric working machine according to claim 1, further comprising:
    a second air flow path provided in a vicinity of the motor, wherein
    the motor:
        includes a fan rotating with the rotation of the motor; and
        is configured to be rotatable in two rotational directions as a right rotation direction and a left rotation direction, the fan:

has two or more linear-shaped vanes so as to extend straight from a center of an axis around which the motor rotates toward an outside in a circumferential direction; and is provided inside the second air flow path to circulate air inside the second air flow path, the second air flow path is configured with a third air flow path and a fourth air flow path so as to branch air circulation in a vicinity of the fan, and the third air flow path and the fourth air flow path are configured in such a manner that an amount of the air circulation varies according to a rotational direction of the two rotational directions of the motor, respectively.

8. The electric working machine according to claim 7, wherein the third air flow path is provided with a portion along approximately first half circumference of an outer periphery of the fan, and the fourth air flow path is provided with a portion along approximately second half circumference of the outer periphery of the fan and the fourth air flow path faces the third air flow path across the axis.

9. The electric working machine according to claim 8, wherein each of the third air flow path and the fourth air flow path is configured in such a manner that a cross-sectional area of a corresponding air flow path of the third and fourth air flow paths expands from upstream to downstream in an air flow direction.

10. The electric working machine according to claim 7, wherein the outlet is configured with a first outlet and a second outlet positioned differently from the first outlet, and the first outlet is connected to the third air flow path, and the second outlet is connected to the fourth air flow path.

11. The electric working machine according to claim 1, wherein the housing has a first width and a second width that is narrower than the first width, and the first and second widths are located along a direction from the centerline of the housing where toward the inlet, and the inlet is provided on the first side of the housing where the second width is positioned.

12. The electric working machine according to claim 1, wherein the inlet has a louver to prevent an object from entering the housing from an upper direction.

13. The electric working machine according to claim 1, wherein the electric working machine is a hedge trimmer, a brush cutter, or a chainsaw.

\* \* \* \* \*